(12) United States Patent
Kaltenbach et al.

(10) Patent No.: US 12,523,276 B2
(45) Date of Patent: Jan. 13, 2026

(54) GEARBOX AND DRIVE UNIT WITH SUCH A GEARBOX

(71) Applicant: ZF Friedrichshafen AG, Friedrichshafen (DE)

(72) Inventors: Johannes Kaltenbach, Friedrichshafen (DE); Thomas Martin, Weissensberg (DE); Fabian Kutter, Kressbronn (DE); Johannes Glückler, Friedrichshafen (DE); Kai Bornträger, Langenargen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/042,712

(22) Filed: Jan. 31, 2025

(65) Prior Publication Data
US 2025/0251033 A1 Aug. 7, 2025

(30) Foreign Application Priority Data
Feb. 2, 2024 (DE) ...................... 10 2024 200 951.2

(51) Int. Cl.
*F16H 57/037* (2012.01)
*F16H 3/66* (2006.01)
(Continued)

(52) U.S. Cl.
CPC ........... *F16H 3/663* (2013.01); *F16H 57/037* (2013.01); *H02K 7/006* (2013.01); *H02K 7/116* (2013.01);
(Continued)

(58) Field of Classification Search
CPC .......... F16H 3/663; F16H 3/66; F16H 57/037; F16H 2057/02034; F16H 2200/0021;
(Continued)

(56) References Cited

U.S. PATENT DOCUMENTS 3,863,524 A * 2/1975 Mori ......................... F16H 3/66
475/287
4,479,404 A * 10/1984 Stockton ................... F16H 3/66
475/318
(Continued)

OTHER PUBLICATIONS

German Patent Office, German Office Action issued in German Patent application No. 10 2024 200 951.2 (Sep. 30, 2024).

*Primary Examiner* — Farhana Pervin
(74) *Attorney, Agent, or Firm* — Finch & Maloney PLLC

(57) ABSTRACT

A gearbox has an input shaft, an output shaft, three shifting elements, and three planetary gearsets each having a sun shaft, ring gear shaft, and web shaft. The first sun shaft, the second sun shaft, and the input shaft are connected rotationally fixed. Rotationally fixed connections are made between the first ring gear shaft and a stationary component, the first web shaft and the second ring gear shaft, the second web shaft and the third sun shaft, and the third web shaft and the output shaft. Closing the first shifting element connects the third ring gear shaft rotationally fixed to a stationary component. Closing the second shifting element connects in a rotationally fixed manner the first web shaft, the second ring gear shaft, the third web shaft, and the output shaft. Closing the third shifting element connects rotationally fixed two of the three shafts of the third planetary gearset.

11 Claims, 3 Drawing Sheets

(51) Int. Cl.
*H02K 7/00* (2006.01)
*H02K 7/116* (2006.01)
*F16H 57/02* (2012.01)

(52) U.S. Cl.
CPC .............. *F16H 2057/02034* (2013.01); *F16H 2200/0021* (2013.01); *F16H 2200/201* (2013.01); *F16H 2200/2038* (2013.01); *F16H 2200/2094* (2013.01); *F16H 2200/2097* (2013.01)

(58) Field of Classification Search
CPC ....... F16H 2200/201; F16H 2200/2038; F16H 2200/2094; F16H 2200/2097; H02K 7/006; H02K 7/116
See application file for complete search history.

(56) References Cited

U.S. PATENT DOCUMENTS

| | | | |
|---|---|---|---|
| 4,702,125 A | 10/1987 | Kalns | |
| 6,083,135 A * | 7/2000 | Baldwin | F16H 3/66 475/276 |
| 2015/0167788 A1* | 6/2015 | Beck | F16H 3/66 475/269 |

* cited by examiner

GEARBOX AND DRIVE UNIT WITH SUCH A GEARBOX

RELATED APPLICATIONS

This application claims the benefit of and right of priority under 35 U.S.C. § 119 to German Patent Application no 10 2024 200 951.2, filed on 2 Feb. 2024, the contents of which are incorporated herein by reference in its entirety.

FIELD OF THE DISCLOSURE

The invention relates to a gearbox for a vehicle. In addition, the invention relates to a drive unit with a single electric machine and a gearbox with three planetary gearsets. The invention also relates to a vehicle with such a drive unit.

BACKGROUND

For example, U.S. Pat. No. 4,702,125 A discloses a drive unit with an electric machine, a gearbox with two gears and a differential. The gearbox comprises two shifting elements in the form of brakes and three planetary gearsets coupled to one another, wherein when one of the two shifting elements is in its closed state it connects the ring gear shaft of the first planetary gearset rotationally fixed to the housing, whereas when the other one of the two shifting elements is in its closed state it connects the ring gear shaft of the second planetary gearset rotationally fixed to the housing.

SUMMARY

The purpose of the present invention is to provide an alternative gearbox with three planetary gearsets for a vehicle. In particular, the gearbox should have three gears, good efficiency and low planetary rotation speeds. This objective is achieved by the features of a gearbox as variously disclosed herein. Advantageous embodiments will be apparent from the description given below and the figures.

A gearbox for a vehicle according to the invention comprises a drive input shaft for connection to an electric machine, a drive output shaft, a first shifting element, a second shifting element, a third shifting element, a first planetary gearset with a first sun shaft, a first ring gear shaft, and a first web shaft, a second planetary gearset with a second sun shaft, a second ring gear shaft, and a second web shaft, and a third planetary gearset with a third sun shaft, a third ring gear shaft, and a third web shaft, wherein the first sun shaft, the second sun shaft, and the drive input shaft are connected rotationally fixed to one another, w herein the first ring gear shaft is connected rotationally fixed to a stationary component, wherein the first web shaft and the second ring gear shaft are connected rotationally fixed to one another, wherein the second web shaft and the third sun shaft are connected rotationally fixed to one another, wherein in the closed state of the first shifting element a first gear with a first gear ratio is engaged, such that in the first gear the third ring gear shaft and a stationary component are connected rotationally fixed to one another, wherein in the closed state of the second shifting element a second gear with a second gear ratio is engaged, such that in the second gear the first web shaft, the second ring gear shaft, the third web shaft and the drive output shaft are connected rotationally fixed to one another, and wherein in the closed state of the third shifting element a third gear with a third gear ratio is engaged, such that in the third gear two of the three shafts of the third planetary gearset are connected to one another.

By coupling two of the three shafts of the third planetary gearset in the closed state of the third shifting element, the third planetary gearset is blocked. By virtue of the blocking of the third planetary gearset the gear ratio is always 1 regardless of the number of teeth of the elements of the third planetary gearset that mesh with one another. To put it differently, the third planetary gearset rotates as a block. According to an embodiment, in the closed state of the third shifting element the third web shaft and the third ring gear shaft are connected rotationally fixed to one another. According to an alternative embodiment, in the closed state of the third shifting element the third web shaft and the third sun shaft are connected rotationally fixed to one another. The gear ratio of the third gear is defined by the third planetary gearset alone.

The gearbox enables the connection of the electric machine so that a drive power can be introduced by way of the drive input shaft. By way of the drive output shaft the gearbox is drivingly connected either to a differential or to a vehicle wheel. Each of the three planetary gearsets comprises three shafts, namely the respective sun shaft, the respective ring gear shaft, and the respective web shaft, wherein each respective web shaft carries a plurality of planetary gearwheels which mesh with, i.e., which are in tooth engagement with both the respective sun shaft and the respective ring gear shaft.

In the context of the invention, a "shaft" is understood to be a rotatable component of the gearbox by way of which respectively associated components of the gearbox are connected rotationally fixed to one another, or b way of which such a connection can be formed when one of the shifting elements is actuated. The shaft concerned can connect the components to one another axially or radially or even both axially and radially. Thus, the shaft concerned can also be present as an intermediate component by means of which a particular component can be connected, for example radially. The term 'shaft' does not exclude that the components to be connected can be made integrally. In particular, two or more shafts connected rotationally fixed to one another can be made integrally. A "stationary" component is understood to be a component which is positionally fixed, in particular connected rotationally fixed or integrally to a housing or part of a housing.

A "shifting element" is understood to be a shiftable device which in a closed state connects two shafts or a shaft and a housing rotationally fixed to one another, and in an open state decouples the two shafts or the shaft and the housing from one another. The two shafts can then rotate relative to one another. The shifting elements are in the form of gear-engaging shifting elements and are thus designed for the engagement of gears. To engage the first gear the first shifting element can be actuated or closed while the other two shifting elements are open. To engage the second gear the second shifting element can be actuated or closed, and in the second gear only the second shifting element is closed while the other two shifting elements are open. To engage the third gear the third shifting element can be actuated or closed, and in the third gear only the third shifting element is closed and the other two shifting elements are open.

According to an embodiment, the first shifting element and the third shifting element are combined to form a dual shifting element. In an alternative embodiment, the second and the third shifting elements are combined to form a dual shifting element. To be shifted, a dual shifting element requires only a single actuator. By using a dual shifting element, to engage three gears only two instead of three actuators are needed, and this increases the compactness.

For example, either the first shifting element and the third shifting element, or the second shifting element and the third shifting element are combined to form a shifting unit with a single sliding sleeve which can be moved to the required position by a single actuator, the shifting unit providing two gear-engaging positions and a neutral position. In a gear-engaging position the shifting elements connect two shafts or a shaft and a housing. In the neutral position two shafts or a shaft and a housing are decoupled from one another by the shifting unit. In particular, the sliding sleeve is of interlocking design and comprises interlocking claws which, in the gear-engaging position, co-operate with corresponding claw teeth in order to produce a rotationally fixed connection between the two shafts or a shaft and the housing. Thus, the claw teeth with which the sliding sleeve co-operates in an interlocking manner should be regarded as a shifting element. Preferably, the shifting unit comprises an unsynchronized claw clutch. By using the sliding sleeve for the engagement of gears the compactness is increased still more.

In an embodiment all three shifting elements are in the form of interlocking shifting elements, specifically claw-type shifting elements. By virtue of such interlocking shifting elements the efficiency of the gearbox can be increased since drag losses are reduced. In particular interlocking shifting elements are made more compactly and are optimized in terms of efficiency, besides having cost advantages compared with frictional shifting elements. The interlocking shifting elements can be synchronized by the electric machine.

A drive unit according to the invention for a vehicle comprises an electric machine and a gearbox according to the invention, with the electric machine arranged either coaxially with or axis-parallel to the gearbox. Preferably, the drive unit also comprises a differential with a differential input shaft for the connection of the drive output shaft, and two differential output shafts, each connected to a respective vehicle wheel.

In a preferred embodiment, the differential is in the form of a bevel gear differential. A differential in the form of a bevel gear differential comprises two wheel-side drive output elements, in particular a first drive output gearwheel and a second drive output gearwheel. The two drive output gearwheels each mesh with a respective equalization element. The equalization elements are mounted to rotate in a differential cage about their own axes. Each drive output gearwheel is connected rotationally fixed to its respective differential output shaft. The drive input to the differential takes place via the differential cage, which is designed as a differential input shaft. Moreover, alternative structural forms of the differential are also conceivable, for example as a ball differential, a spur gear differential, or a planetary differential. The drive power supplied to the differential by way of the differential input shaft is distributed in a known manner to the two differential output shafts and transmitted to the drive wheels of the axle. The differential output shafts are designed to be drivingly connected to the drive wheels of the vehicle. The differential output shaft concerned can be connected to its associated vehicle wheel directly or immediately, or indirectly or intermediately by way of a downstream fixed gear ratio, a joint, a joint shaft, and/or a wheel hub.

The gearbox according to the invention is particular is suitable for an electrical central drive system which comprises a downstream differential gear ratio, in particular a bevel gear ratio. The preferred installation position of the drive unit is along the travel direction of the vehicle. Alternatively, the drive unit can be installed transversely to the travel direction of the vehicle, and in that case a downstream bevel gear ratio on the differential is omitted and the electric machine can be connected axis-parallel via at least one spur gear ratio. For example, depending on the gear ratio required and the fitting space situation one or more spur gear stages can be provided for that purpose.

A vehicle according to the invention comprises a drive unit according to the invention. The above definitions and explanations regarding technical effects, advantages and advantageous embodiments of the gearbox according to the invention obviously also apply to the drive unit according to the invention and to the vehicle according to the invention.

BRIEF DESCRIPTION OF THE DRAWINGS

Advantageous embodiments of the invention, which are explained in what follows, are illustrated in the drawings in which the same or similar elements are denoted by the same indexes, and which show.

DETAILED DESCRIPTION

Figure 1:
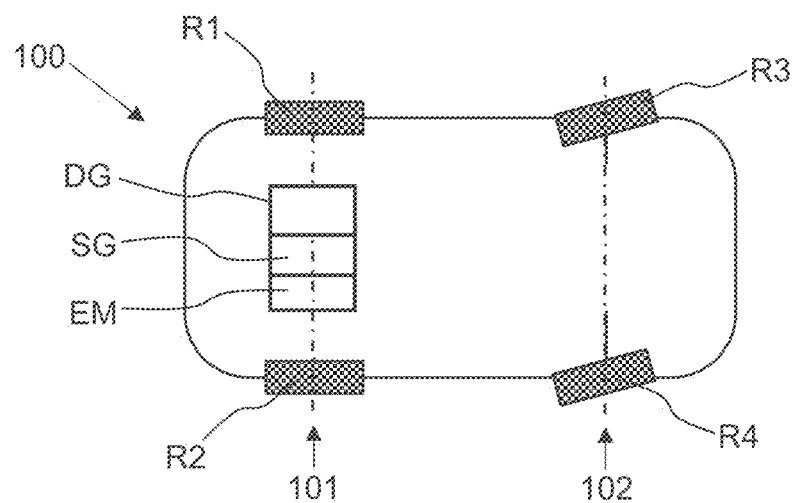
FIG. 1: A greatly abstracted schematic view of a vehicle with a drive axle comprising a drive unit according to the invention.

FIG. 1 shows a vehicle 100 with a first axle 101 with two vehicle wheels R1, R2 and a second axle 102 with two vehicle wheels R3, R4. In this case the first axle 101 is designed as the rear axle of the vehicle 100 and is equipped with a drive unit according to the invention. The drive unit comprises an electric machine EM which is designed to generate a drive power, a gearbox SG with a plurality of gears and a differential DG. Thus, the vehicle 100 is designed as an electric vehicle, i.e., as a vehicle that can be powered electrically. The drive unit is arranged transversely to the longitudinal axis of the vehicle and is drivingly connected to the vehicle wheels R1, R2 of the first axle 101. Alternatively, the drive unit can be installed in the longitudinal direction of the vehicle. FIGS. 2 to 5 show a respective drive unit which can be installed in the longitudinal direction in the vehicle and FIG. 5 shows a drive unit which can be installed in the vehicle transversely to the longitudinal direction.

In this case, no further drive unit is arranged on the second axle 102, i.e., on the front axle of the vehicle 100, whereby costs, weight, and fitting space are saved. Alternatively, the drive unit can be fitted on the front axle of the vehicle 100 instead of on its rear vehicle. To produce an all-wheel drive system a further drive unit can be arranged on the second axle 102 and drivingly connected to the vehicle wheels R3, R4 of that axle 102.

Figure 2:
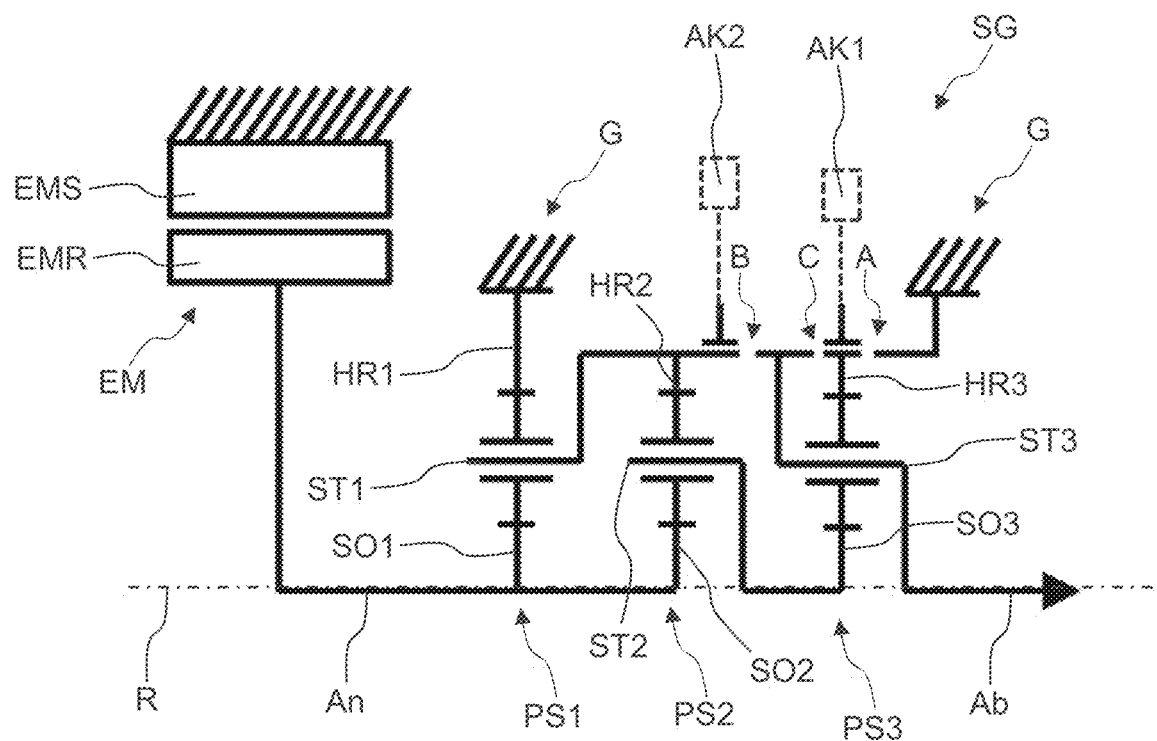
FIG. 2: A greatly abstracted schematic view of a drive unit according to the invention with a gearbox according to a first embodiment.

FIG. 2 shows a drive unit for a vehicle with a gearbox SG according to a first embodiment. This embodiment is provided for installation in the vehicle along the travel direction of the vehicle. The gearbox SG is connected by way of a drive input shaft An to an electric machine EM which comprises a stator EMS fixed to the housing and a rotatable rotor EMR. The electric machine is arranged coaxially with the gearbox SG. Thus, the gearbox SG and the electric machine EM form the electric drive unit.

The gearbox SG comprises exactly three shifting elements, namely, a first shifting element A, a second shifting element B. and a third shifting element C, and exactly three planetary gearsets, namely, a first planetary gearset PS1, a second planetary gearset PS2, and a third planetary gearset PS3. The first planetary gearset PS1 comprises three shafts, namely, a first sun shaft SO1, a first ring gear shaft HR1, and a first web shaft ST1. The first web shaft ST1 carries a plurality of planetary gearwheels, which mesh. i.e., are in tooth engagement, both with the first sun shaft SO1 and with the first ring gear shaft HR1. The second planetary gearset PS2 also comprises three shafts, namely, a second sun shaft SO2, a second ring gear shaft HR2, and a second web shaft ST2. The second web shaft ST2 carries a plurality of planetary gearwheels, which mesh both with the second sun shaft SO2 and with the second ring gear shaft HR2. The third planetary gearset PS3 also comprises three shafts, namely, a third sun shaft SO3, a third ring gear shaft HR3, and a third web shaft ST3. The third web shaft ST3 carries a plurality of planetary gearwheels, which mesh both with the third sun shaft SO3 and with the third ring gear shaft HR3. Furthermore, the three planetary gearsets PS1, PS2, PS3 are arranged axially adjacent to one another in order to increase the compactness. The shifting elements A. B, and C are arranged at a periphery of the planetary gearsets, in particular at a periphery of the third planetary gearset PS3. The second planetary gearset PS2 is positioned axially between the first and the third planetary gearsets PS1, PS3.

The first sun shaft SOL, the second sun shaft SO2, and the drive input shaft An are connected rotationally fixed to one another. The first ring gear shaft HR1 is connected rotationally fixed to a stationary component in the form of a housing. The first web shaft ST1 and the second ring gear shaft HR2 are connected rotationally fixed to one another. The second web shaft ST2 and the third sun shaft SO3 are connected rotationally fixed to one another. Furthermore, the third web shaft ST3 and a drive output shaft Ab are connected rotationally fixed to one another. The drive output shaft Ab can be drivingly connected to a drive wheel of the vehicle either indirectly, for example by way of a differential, or directly, in this case that connection being indicated by an arrow on the drive output shaft Ab. The gearbox SG has a rotational axis of symmetry R which coincides with the drive input shaft An and the drive output shaft Ab. The electric machine EM, as well as the planetary gearsets PS1, PS2, PS3 are arranged coaxially with the drive input shaft An and the drive output shaft Ab. The embodiments represented in FIGS. 2 to 4 show only the "upper" half of the drive unit concerned; the "lower" half is not shown but is symmetrical in form to the "upper" half.

All the shifting elements A, B, and C are in the form of interlocking shifting elements. The first shifting element A and the third shifting element C are combined to form a dual shifting element and can be activated by a first actuator AK1. The second shifting element B can be activated by a second actuator AK2. In the closed state of the first shifting element A, a first gear with a first gear ratio is engaged, and in this first gear the third ring gear shaft HR3 is connected rotationally fixed to a stationary component in the form of a housing. In the closed state of the second shifting element B a second gear with a second gear ratio is engaged, and in this second gear the first web shaft ST1, the second ring gear shaft HR2, the third web shaft ST3 and the drive output shaft Ab are all connected rotationally fixed to one another. In the closed state of the third shifting element C a third gear with a third gear ratio is engaged, such that in the third gear two of the three shafts of the third planetary gearset PS3 are connected, whereby the third planetary gearset PS3 is blocked and has a gear ratio of 1. In the closed state of the third shifting element C the third web shaft ST3 and the third ring gear shaft HR3 are connected rotationally fixed to one another. In the present case none of the three shifting elements A, B, C is shown as activated.

Figure 3:
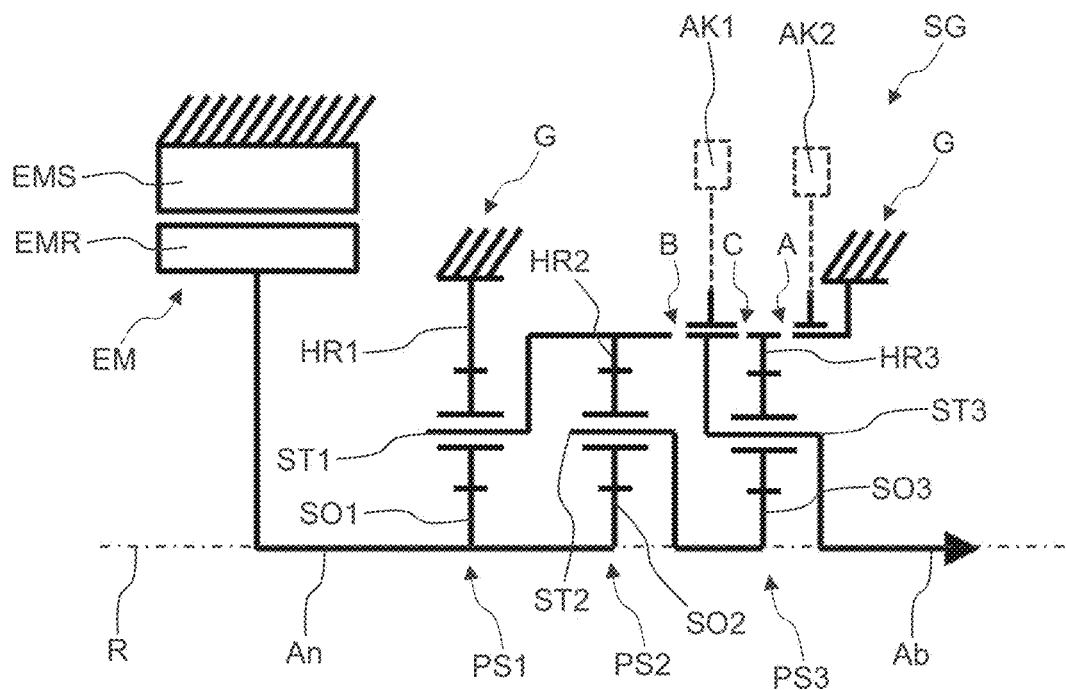
FIG. 3: A greatly abstracted schematic view of a drive unit according to the invention with a gearbox according to a second embodiment.

FIG. 3 shows a second embodiment of the gearbox SG according to the invention, which is connected via the drive input shaft An to an electric machine EM. The electric drive unit so formed, shown in FIG. 3, corresponds essentially to the electric drive unit in FIG. 2, the difference between these two embodiments consisting in the stricture of the shifting elements A, B. and C. In this case, the second shifting element B and the third shifting element C are combined to form a dual shifting element, which can be activated by a first actuator AK1 The first shifting element A can be activated by a second actuator AK2. In other respects, the example embodiment shown in FIG. 3 corresponds to the example embodiment in FIG. 2, to which reference can be made.

Figure 4:
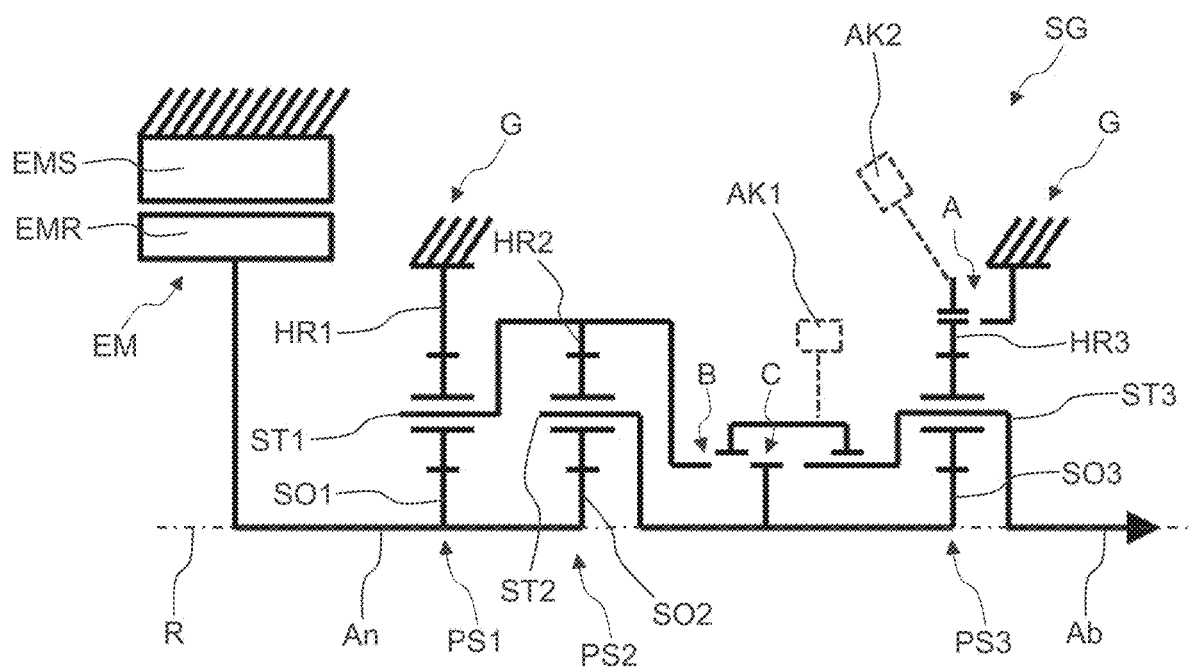
FIG. 4: A greatly abstracted schematic view of a drive unit according to the invention with a gearbox according to a third embodiment.
Figure 5:
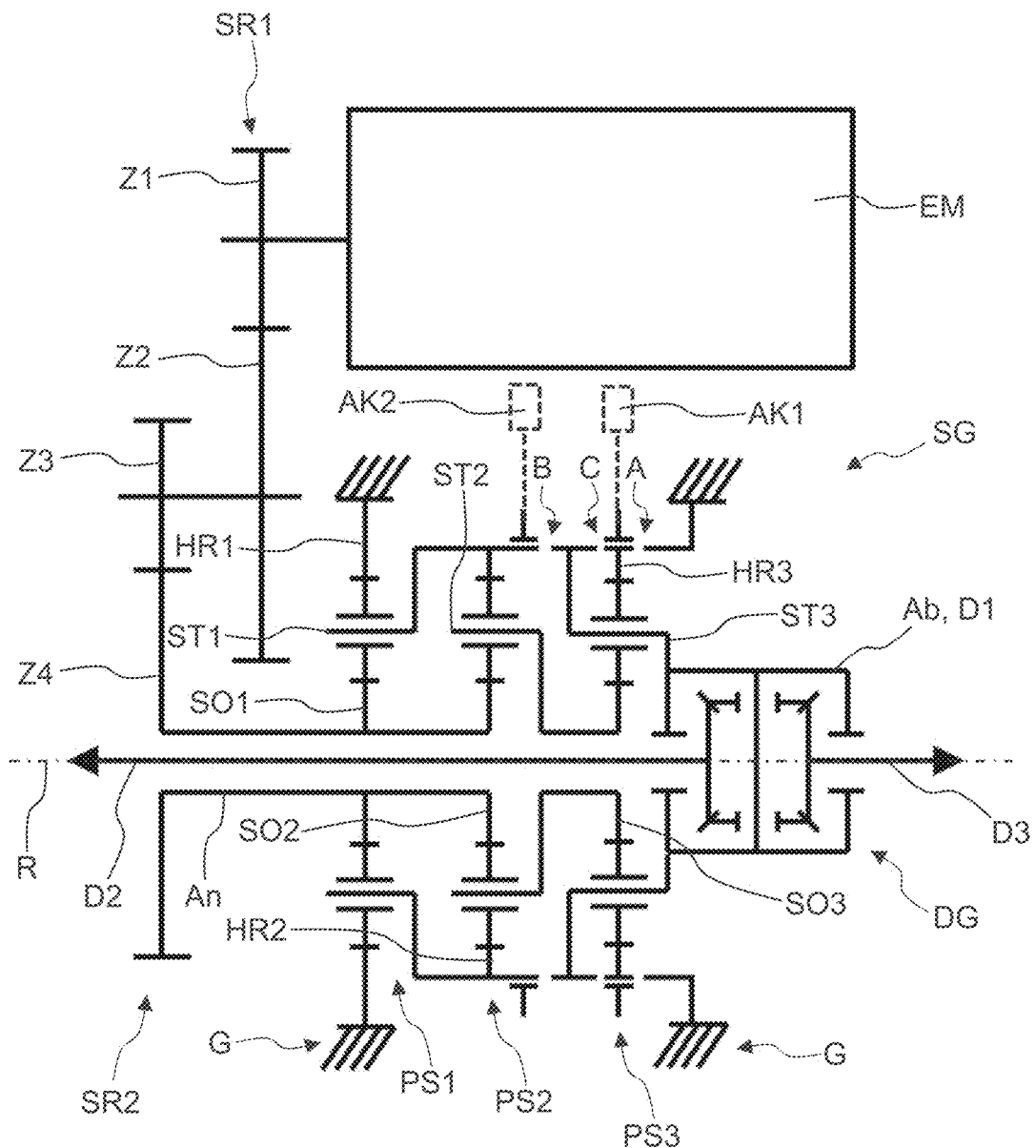
FIG. 5: A greatly abstracted schematic view of a drive unit according to the invention with a gearbox according to a fourth embodiment.

FIG. 4 shows a third embodiment of the gearbox SG according to the invention, which is connected via the drive input shaft An to an electric machine EM The electric drive unit so formed, shown in FIG. 4, corresponds essentially to the electric drive unit in FIG. 3, the difference between these two embodiments consisting in the arrangement and connection of the second and third shifting elements B and C. In this case the second shifting element B and the third shifting element C are again combined to form a dual shifting element, but they are arranged axially between the second and third planetary gearsets PS2, PS3 a smaller distance away from the rotation axis R. In the closed state of the third shifting element C the third web shaft ST3 and the third sun shaft SO3 are connected rotationally fixed to one another. This represents a blocking variant of the third planetary gearset PS3. In other respects, the example embodiment according to FIG. 4 corresponds to the example embodiment shown in FIG. 3, to which reference can be made.

FIG. 5 shows a fourth embodiment of the gearbox SG according to the invention, which is connected via the drive input shaft An to an electric machine EM The electric drive unit so formed corresponds essentially to the electric drive unit shown in FIG. 2, a difference between those two embodiments consisting in the arrangement and connection of the electric machine EM. In this case the electric machine EM is connected to the drive input shaft An by way of a first and a second spur gear stage SR1, SR2. The first spur gear stage SR1 comprises a first and a second spur gear Z1, Z2 which mesh with one another, and the first spur gear Z1 is connected rotationally fixed to a rotor shaft of the electric machine EM. The second spur gear stage SR2 comprises a third and a fourth spur gear Z3, Z4 which mesh with one another, and the third spur gear Z3 is connected rotationally fixed to the second spur gear Z2 and the fourth spur gear Z4 is connected rotationally fixed to the drive input shaft An Alternatively, the electric machine can be connected to the gearbox SG by a single spur gear stage.

In addition, the drive unit comprises a differential DG with a differential input shaft D1 for connection to the drive output shaft Ab and two differential output shafts D2. D3 for connection to respective vehicle wheels. The differential is in the form of a bevel gear differential. The differential input shaft D1 is connected rotationally fixed to the drive output shaft Ab and the third web shaft ST3 connected rotationally fixed thereto. The bevel gear differential has two wheel-side drive output elements, in particular a first drive output gearwheel and a second drive output gearwheel. The two drive output gearwheels mesh in each case with an equalization element. The equalization elements are mounted rotatably about their own axes in a differential cage in the form of the differential input shaft D1 Each drive output gearwheel is connected rotationally fixed to its respective differential output shaft D2, D3. The drive input to the differential DG takes place by way of the differential cage. The connection to the respective vehicle wheels of the vehicle axle concerned is indicated by arrows on the differential output shafts D2, D3. This embodiment is provided for installation in the vehicle transversely to the travel direction. In other respects, the example embodiment according to FIG. 5 corresponds to the example embodiment shown in FIG. 2, to which reference can be made.

INDEXES

100 Vehicle
101 First axle
102 Second axle
R1 Vehicle wheel
R2 Vehicle wheel
R3 Vehicle wheel
R4 Vehicle wheel
An Drive input shaft
Ab Drive output shaft
SG Gearbox
EM Electric machine
EMS Stator of the electric machine
EMR Rotor of the electric machine
SR1 First spur gear stage
SR2 Second spur gear stage
Z1 First spur gear
Z2 Second spur gear
Z3 Third spur gear
Z4 Fourth spur gear
PS1 First planetary gearset
SO1 First sun shaft
HR1 First ring gear shaft
ST1 First web shaft
PS2 Second planetary gearset
SO2 Second sun shaft
HR2 Second ring gear shaft
ST2 Second web shaft
PS3 Third planetary gearset
SO3 Third sun shaft
HR3 Third ring gear shaft
ST3 Third web shaft
AK1 First actuator
AK2 Second actuator
G Housing
R Axis of symmetry
DG Differential
D1 Differential input shaft
D2 First differential output shaft
D3 Second differential output shaft
A First shifting element
B Second shifting element
C Third shifting element

The invention claimed is:

1. A gearbox for a vehicle, comprising:
a drive input shaft for connection to an electric machine;
a drive output shaft;
a first shifting element, a second shifting element, and a third shifting element a first planetary gearset with a first sun shaft, a first ring gear shaft, and a first web shaft; and
a second planetary gearset with a second sun shaft, a second ring gear shaft and a second web shaft;
a third planetary gearset with a third sun shaft, a third ring gear shaft, and a third web shaft;
wherein the first sun shaft, the second sun shaft, and the drive input shaft are connected rotationally fixed to one another;
wherein the first ring gear shaft is connected rotationally fixed to a stationary component;
wherein the first web shaft is connected rotationally fixed to the second ring gear shaft;
wherein the second web shaft is connected rotationally fixed to the third sun shaft;
wherein the third web shaft is connected rotationally fixed to the drive output shaft;
wherein in the closed state of the first shifting element a first gear with a first gear ratio is engaged, such that in the first gear the third ring gear shaft is connected rotationally fixed to a stationary component;
wherein in the closed state of the second shifting element a second gear with a second gear ratio is engaged, such that in the second gear the first web shaft, the second ring gear shaft, the third web shaft and the drive output shaft are connected rotationally fixed to one another; and
wherein in the closed state of the third shifting element a third gear with a third gear ratio is engaged, such that in the third gear two of the three shafts of the third planetary gearset are connected to one another.

2. The gearbox according to claim 1, wherein the first shifting element and the third shifting element are combined to form a dual shifting element.

3. The gearbox according to claim 1, wherein the second shifting element and the third shifting element are combined to form a dual shifting element.

4. The gearbox according to claim 1, wherein all the shifting elements are in the form of interlocking shifting elements.

5. The gearbox according to claim 1, wherein in the closed state of the third shifting element the third web shaft is connected rotationally fixed to the third ring gear shaft.

6. The gearbox according to claim 1, wherein in the closed state of the third shifting element the third web shaft is connected rotationally fixed to the third sun shaft.

7. A drive unit for a vehicle, comprising an electric machine and the gearbox according to claim 1, wherein the electric machine is arranged coaxially with the gearbox.

8. A drive unit according to claim 7, comprising:
a differential with a differential input shaft configured for connecting the drive output shaft; and
two differential output shafts each configured for connecting to a vehicle wheel.

9. A vehicle companying at least one drive unit according to claim 7.

10. A drive unit for a vehicle, comprising an electric machine and the gearbox according to claim 1, wherein the electric machine is arranged axis-parallel to the gearbox.

11. A drive unit according to claim 10, comprising:
a differential with a differential input shaft configured for connecting the drive output shaft; and
two differential output shafts each configured for connecting to a vehicle wheel.

\* \* \* \* \*